(12) United States Patent
Hettema et al.

(10) Patent No.: US 10,712,993 B2
(45) Date of Patent: *Jul. 14, 2020

(54) THEMATIC INTERACTIVE ATTRACTION

(71) Applicant: LEGENDS ATTRACTIONS, LLC, New York, NY (US)

(72) Inventors: Philip Hettema, Los Angeles, CA (US); Eric Hungerford, Pasadena, CA (US); Jake Barton, New York, NY (US)

(73) Assignee: Legends Attractions, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,813

(22) Filed: Aug. 14, 2019

(65) Prior Publication Data

US 2019/0369943 A1 Dec. 5, 2019

Related U.S. Application Data

(63) Continuation of application No. 15/168,408, filed on May 31, 2016, now Pat. No. 10,409,541.

(60) Provisional application No. 62/168,086, filed on May 29, 2015.

(51) Int. Cl.
| | |
|---|---|
| *G06F 3/14* | (2006.01) |
| *G09F 27/00* | (2006.01) |
| *H04N 9/12* | (2006.01) |
| *G06F 3/03* | (2006.01) |
| *G06F 3/01* | (2006.01) |
| *G06F 3/0482* | (2013.01) |
| *G09F 9/302* | (2006.01) |

(52) U.S. Cl.
CPC ............ *G06F 3/1446* (2013.01); *G06F 3/017* (2013.01); *G06F 3/03* (2013.01); *G06F 3/0482* (2013.01); *G06F 3/1423* (2013.01); *G09F 27/00* (2013.01); *H04N 9/12* (2013.01); *G09F 9/3026* (2013.01)

(58) Field of Classification Search
CPC ....... G06F 3/1446; G06F 3/017; G06F 3/0482
See application file for complete search history.

(56) References Cited

U.S. PATENT DOCUMENTS

| | | | | |
|---|---|---|---|---|
| 5,602,978 A * | 2/1997 | Lastinger | ................ | G06T 15/10 345/419 |
| 6,343,006 B1 * | 1/2002 | Moscovitch | ............ | B60R 11/02 348/794 |
| 8,596,599 B1 * | 12/2013 | Carson | ................ | B60R 11/0235 211/26 |
| 8,842,113 B1 * | 9/2014 | Holt | ........................ | G09G 5/12 345/419 |
| 2003/0151562 A1 * | 8/2003 | Kulas | .................... | G06F 3/1446 345/1.1 |

(Continued)

*Primary Examiner* — Premal R Patel
(74) *Attorney, Agent, or Firm* — Gottlieb, Rackman & Reisman, P.C.

(57) ABSTRACT

An attraction includes a geometrically arranged set of displays mounted around a vertically oriented ring shaped support. The displays form a closed loop with an open center, a front side where the displays are visible to an audience, and a rear side where a human concierge facilitating content shown in the displays, such as through an interactive control system, can be positioned and would be visible by the audience through the open center of the vertical loop of displays.

20 Claims, 13 Drawing Sheets

(56) References Cited

U.S. PATENT DOCUMENTS

| | | | |
|---|---|---|---|
| 2007/0003920 A1* | 1/2007 | Laun | G09B 5/06 |
| | | | 434/428 |
| 2013/0255544 A1* | 10/2013 | Scharing | A47B 21/00 |
| | | | 108/50.01 |
| 2014/0007472 A1* | 1/2014 | Taylor | A47F 5/10 |
| | | | 40/124 |
| 2014/0245932 A1* | 9/2014 | McKenzie, III | A47B 21/02 |
| | | | 108/50.01 |
| 2015/0277182 A1* | 10/2015 | Koizumi | F16M 11/10 |
| | | | 349/58 |
| 2017/0110036 A1* | 4/2017 | Hall | G09F 21/04 |
| 2017/0311408 A1* | 10/2017 | Gawel | G06F 3/1446 |

* cited by examiner

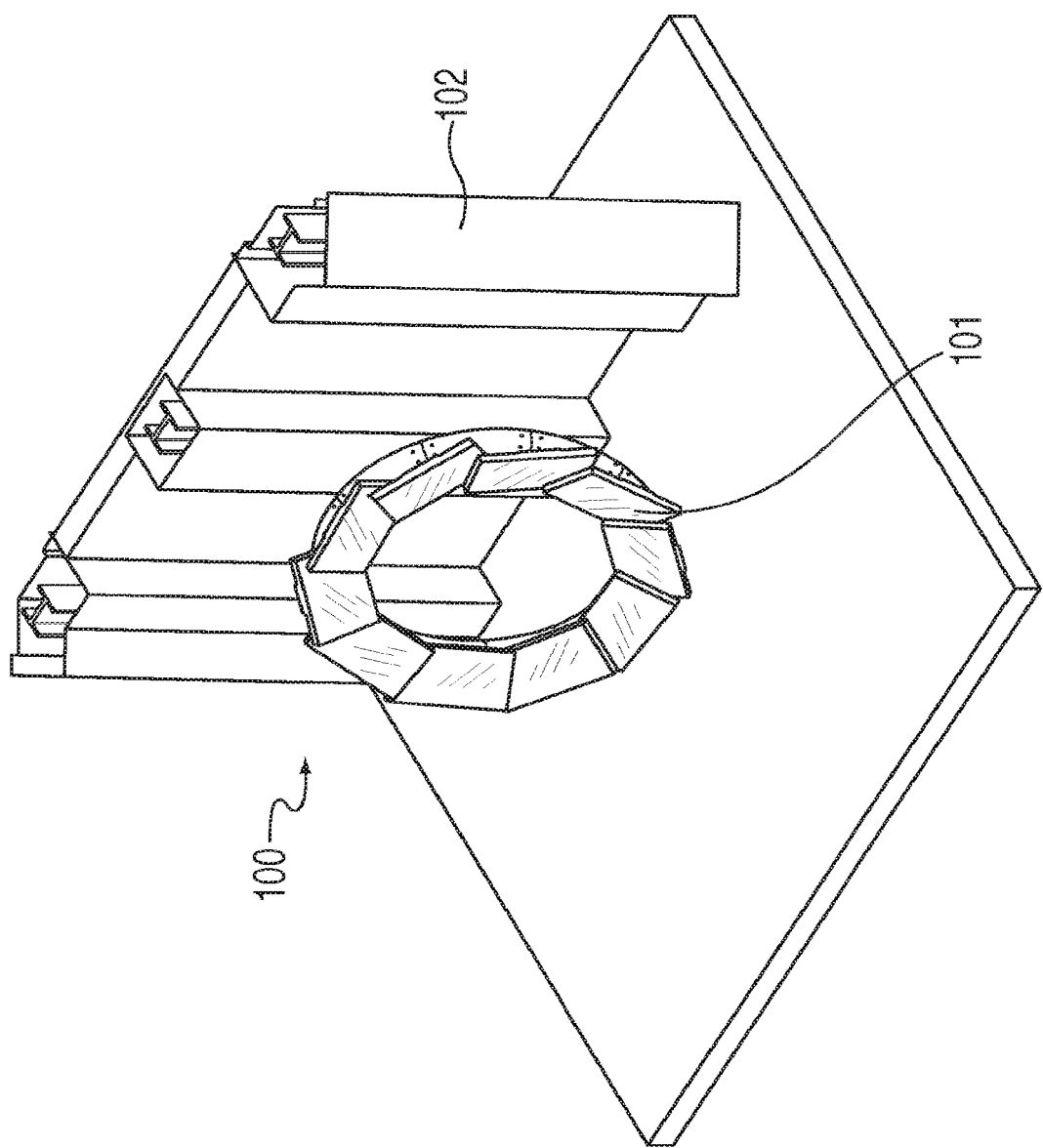

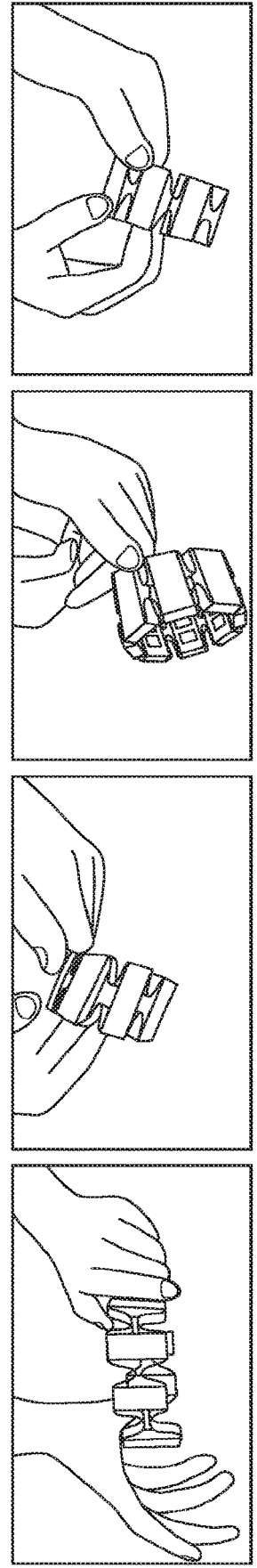
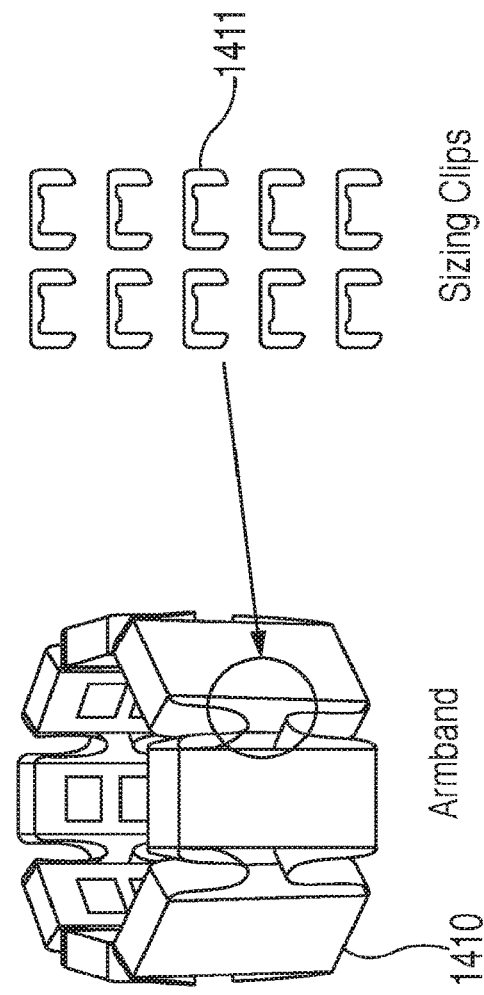
Myo must have a strong electrical connection to the muscles in your forearm to work properly. If the armband feels loose, use the Myo Sizing Clips on every other flex band to tighten the device until it fits snugly. Refer to the images above to see how to use Sizing Clips.
FIG. 14

THEMATIC INTERACTIVE ATTRACTION

CROSS-REFERENCE TO RELATED APPLICATIONS

This application is a continuation of U.S. application Ser. No. 15/168,408, filed May 31, 2016 and claims the priority of U.S. Provisional Patent Application Ser. No. 62/168,086, filed on May 29, 2015.

BACKGROUND OF THE INVENTION

The invention is generally directed to an attraction which draws a visitor's attention from other visual attractions in a fashion which provides a stunning visual perspective including a collection of curated images organized and facilitated by a human ambassador providing narrative and visual content and varying the visual presentation in an interactive fashion with an audience utilizing a gesture-based language to manufacture a bespoke experience.

In the past, attractions found in distinctive settings such as high altitude observatories, theme parks, museums or other entertainment attractions seek to communicate to the visitors information related to the locale or environment of the attraction in a meaningful and interesting fashion without distracting from the natural attraction of the environment or without being overwhelmed by the natural environment. Efforts in the past have been made to include signage and video presentations related to the general locale or to the environment in which the attraction resides so as to provide a context for the visitors to the attraction.

However, these presentations have, in general, lacked an active format which can sustain the visitors' attention and interest beyond a simple sequencing of relevant information presented in a generally static or "ticker" type format. Accordingly, there is a need for an improved attraction which can attract the visitors' interest for a significant period of time in which relevant and interesting information related to the venue or its environment can be presented to the visitors in a generally structured format with sufficient flexibility to engage the actual visitors such that their experience is tailored to an interactively expressed desire for selection among a variety of narratives. Numerous content modules are available to the concierge, who can present appropriate content modules based on the make-up of the audience or specific requests of guests.

There is also a desire to have the audience interact with a human host concierge who is able to tailor the attraction show to the desires to the specific audience and make the visual performance tailored within predefined narratives to the interests of the specific guests involved.

SUMMARY OF THE INVENTION

The invention is generally directed to an attraction for use within a larger environment wherein a physically meaningful structure is formed to support a plurality of displays arranged in a geometrical fashion which allows for presentation of discrete images in each of the displays, grouped displays which display a single image or all of the displays displaying a single image to provide a narrative related to the attraction's environs.

The invention is also generally directed for use within a larger attraction environment wherein a large physical structure supports an array of LCD displays arranged in a geometrical fashion which allows for presentation of discrete images in each of the displays, several grouped displays that show contiguous images, or all of the displays displaying a single discrete image to provide a narrative related to the attraction's context, Another object of the invention is to provide an improved narrative interactive display, which provides images and sound associated with the environs of an attraction through audience interaction with an interactive concierge controlling the displays through a gesture language.

Still another object of the invention is to provide a multi-picture display environment controlled interactively by a human concierge utilizing a gesture language to responsively create a bespoke show for an audience.

Yet another object of the invention is to provide a means for conveying information related to a wide variety of relevant topics surrounding an attraction location to educate and entertain an audience with an interactive partially scripted and partially adlibbed presentation backed by creative use of stored images related to the a specific content module.

Yet still another object of the invention is to provide in improved display attraction which visually collects an audience which sees the attraction and the surrounding environment to provide a partially scripted and partially adlibbed performance supported by a visually striking collection of relevant pictures tied together with the human concierge's oral narrative as modified by audience interaction, Still other objects and advantages of the invention will, in part, be obvious and will, in part, be apparent from the specification.

The invention accordingly comprises the features of construction, combinations of elements and arrangements of part and processes which will be exemplified in the constructions and processes as hereinafter set forth, and the scope of the invention will be indicated in the claims.

BRIEF DESCRIPTION OF THE DRAWINGS

The present invention will now be described in more complete detail with frequent reference being made to the figures identified below.

FIG. 1 is a perspective view of the thematic interactive attraction in accordance with a preferred embodiment of the invention;

FIG. 14 is a perspective view of a Bluetooth armband utilized in connection with the thematic attraction of FIGS. 1-13.

DETAILED DESCRIPTION OF THE PREFERRED EMBODIMENTS

Figure 3:
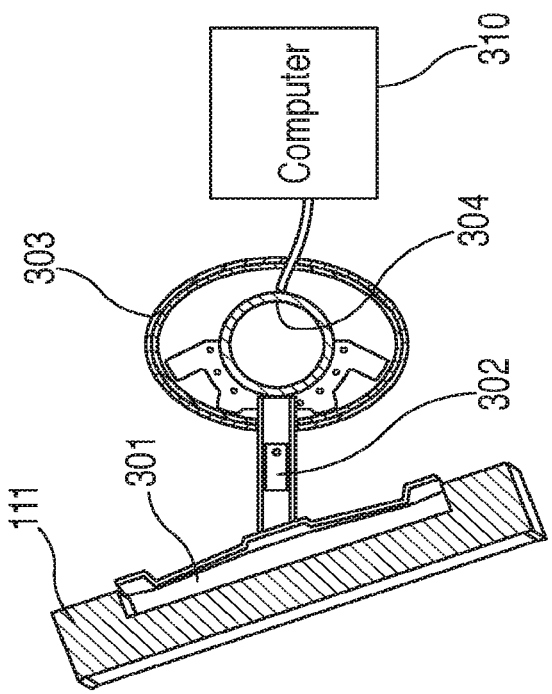
Figure 2:
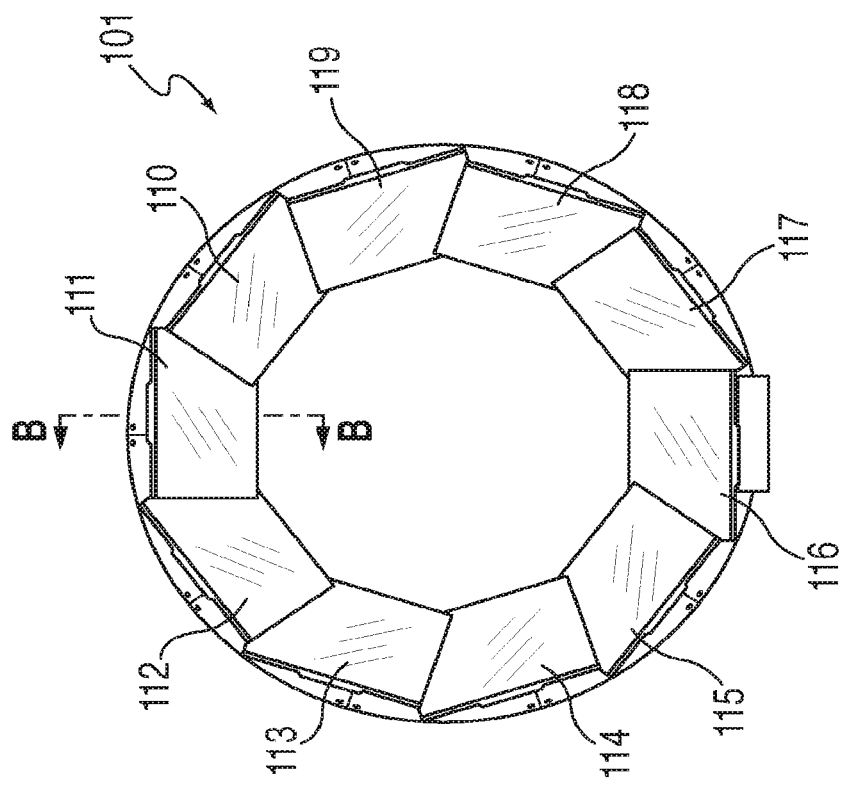
FIG. 2 is a front elevational view of the display elements of the attraction of FIG. 3 is a cross sectional taken along line BB of FIG. 2.

With reference to FIGS. 1-14, the invention is directed to a multi-media thematic interactive attraction 100 utilized to provide a narrative related to the theme of the attraction. In a current preferred embodiment of the invention, the thematic attraction 100 is directed to the theme of the city of New York and the One World Trade Center observatory known as One World Observatory. The interactive attraction is configured as a ring 101 including ten display screens 110-119 organized in a ring fashion as shown in FIGS. 1 and 2 and mounted to a support ring 103. The ring of displays 101 is curated and directed by an ambassador or concierge 430 (FIG. 4) who controls the narrative presented on the displays in an interactive fashion using gestures which can be interpreted by the attraction through use of an armband 431 and a clicker 432 which can be used to advance the narrative along with the verbal presentation by the ambassador 430. The combination of the verbal narrative and visual narrative provide an interactive experience The attraction 100, shown in FIG. 1, includes the ring of displays 101 which are supported on a structure that includes support ring 103 which holds the displays in place apparently suspended in the air. In fact, the ring 101 with displays 110-119 are supported, powered and provided data through the support structure shown in FIG. 3. The display 101 is connected through connectors 304 to a computer 310. An inner structural ring 320 provides support for respective standoffs 302 that hold associated mounting plates 301 to which the displays are connected. The standoffs 302 are connected to the inner structural ring by welding or other means.

The structural ring 320 is clad in a fiberglass shell 303 so as to hide the mechanical elements and electrical and data conductors 304 from the viewers who are generally arrayed in front of the ring of displays. One or more supports 322 can be placed on the outside of the structural ring 320 and provide support for the outer shell 303. Power and data for the displays can be routed circumferentially around the support ring 103 on the interior of the outer shell 303. In practice, the concierge or ambassador 430 stands in front of or slightly to one side or the other of the ring of displays 101 and interacts with the audience which is arrayed in front of the monitors a sufficient distance to allow the entire the ring to be easily visible.

Images shown on the ring of displays can either be 10 discrete images, collections of 2 or more displays showing a single image, or the entire ring of 10 displays showing a single display image covering all of the displays at once. During the show, which is provided through the coordination of the ambassador and the audience, a series of components of the narrative highlighting the thematic elements of the show proceed through a generally organized flow. In a current embodiment, the thematic attraction starts with an attract mode which operates between performances, followed by an intro section, which draws in the audience to the show. This is followed by a panoramic portion showing panoramic images of the thematic element, in the current preferred embodiment, of the New York City area surrounding the One World Observatory. Next is a story component which is a bespoke component developed through the interaction of the audience and the attraction ambassador who can select among a variety of different thematic elements, each of which has a series of more detail specific sub-thematic elements which are selected through the interests of the audience members. Next there is a Buzz element which incorporates social media postings which are current and can be curated by the attraction staff so as not to display offensive or otherwise objectionable content. Finally, there is an Outro section which sums up the thematic elements and leaves the audience with a positive response.

Figure 4:
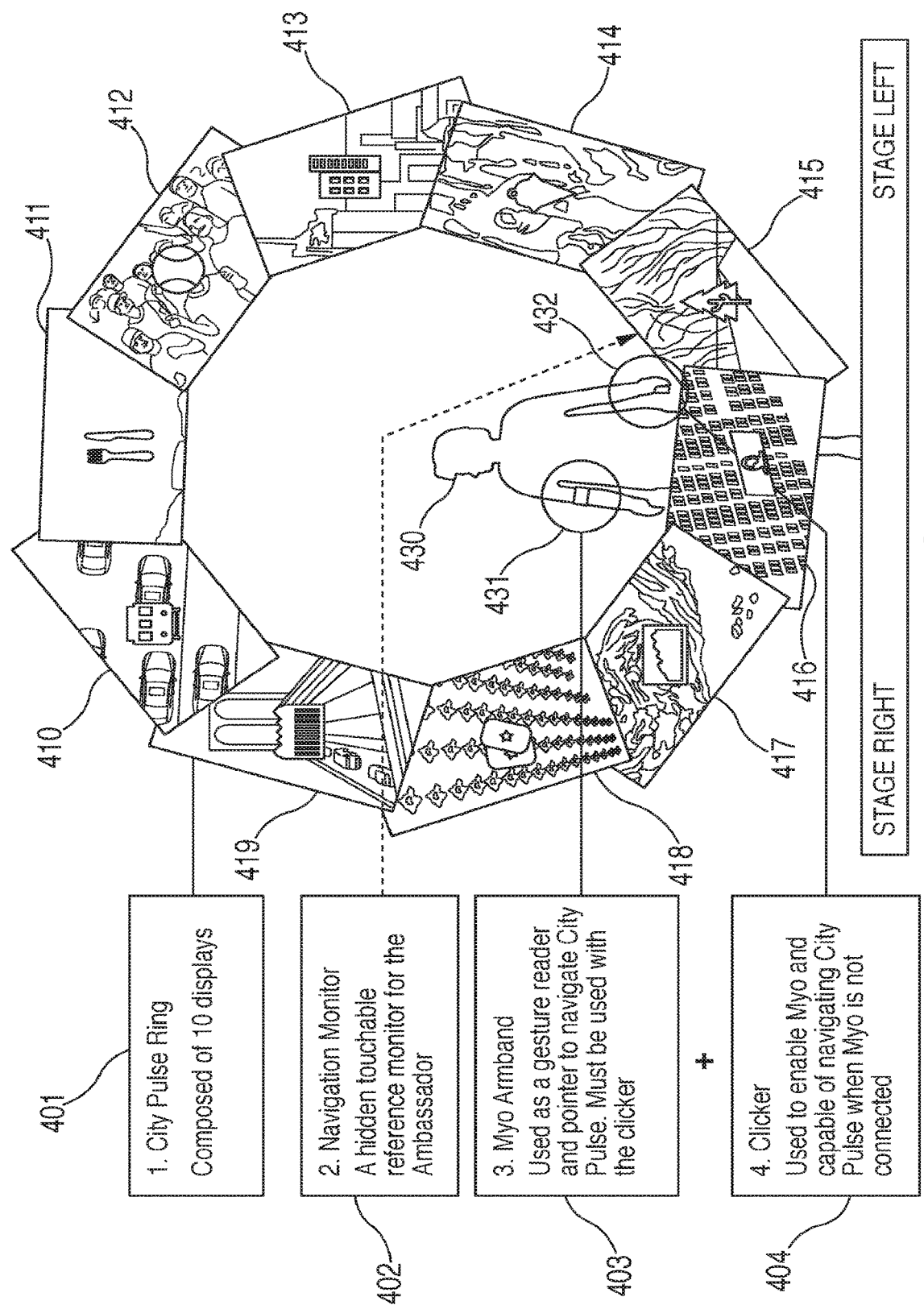
FIG. 4 is a diagrammatic view of the display elements of the attraction of FIGS. 1-3 identifying the main elements.

With reference to FIG. 4, the interactive display includes the ambassador 430 shown in the center of the ring, and the ring of high-definition displays formed of ten separate displays 410-419. The display monitor 415 shown as the Navigation Monitor includes a hidden touchable reference monitor for the ambassador on the back of the ring so that it is not visible to the audience in front of the ring of displays. The ambassador is shown to be wearing a bluetooth armband 431 to act as a gesture reader and pointer to navigate the display. If used with a clicker 432 shown in the left hand of the ambassador to enable the bluetooth gesture reader and to enable the navigation of the displays when the bluetooth armband is not connected. Between the armband 431, a clicker 432 and navigation monitor (on the back of monitor 415) the ambassador 430 can control the flow of the displays and the different segments of the narrative show.

The ring of monitors 110-419 is shown as the City Pulse Ring 401. The navigation monitor 402 has a hidden touchable monitor (not shown) for the ambassador 430. The MYO armband 403 is used as a gesture member and pointer to navigate the City Pulse Ring 405. The clicker 404 is used to enable the MYO armband 403 and is capable of navigating the City Pulse Ring 401 when armband 403 is not connected.

Figure 5:
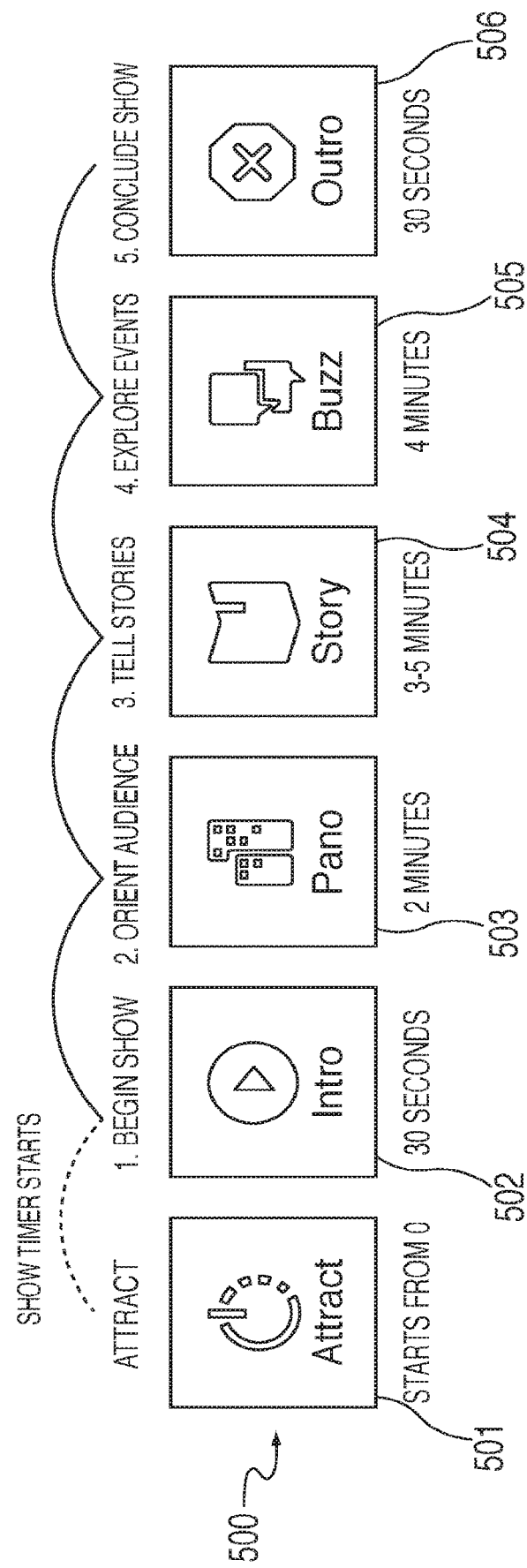
FIG. 5 is a flow diagram for the suggested order of the show for the attraction of FIGS. 1-4.

Reference is next made to FIG. 5 wherein the different components of a show 500 are shown. Prior to the show starting the thematic attraction 100 is in its attract mode 501 utilized to attract attention to the thematic attraction 100 and build a crowd for an upcoming show. Next, once the show starts, it begins generally with an introductory performance 502 which prepares the audience for the show. Next, the panoramic segment 503 orients the audience to the features of the thematic attraction. The main story components 504 of the show tell a variety of stories which are adapted to the interests of the audience by the ambassador. Next, the Buzz section 505 explores the events that have taken place related to the thematic attraction and finally a prepared conclusion to the show is provided in the Outro portion 506 of the show 500. As shown in FIG. 5, the show is approximately 10 to 12 minutes as an appropriate length to provide significant information while maintaining the flow of visitors through this thematic attraction 100 to the larger events location. FIG. 5 includes a suggested flow through of 10 to 12 minutes, although this can be altered either as a matter of preplanning or variations by the ambassador based upon the interests of each audience for a particular show.

Figure 6:
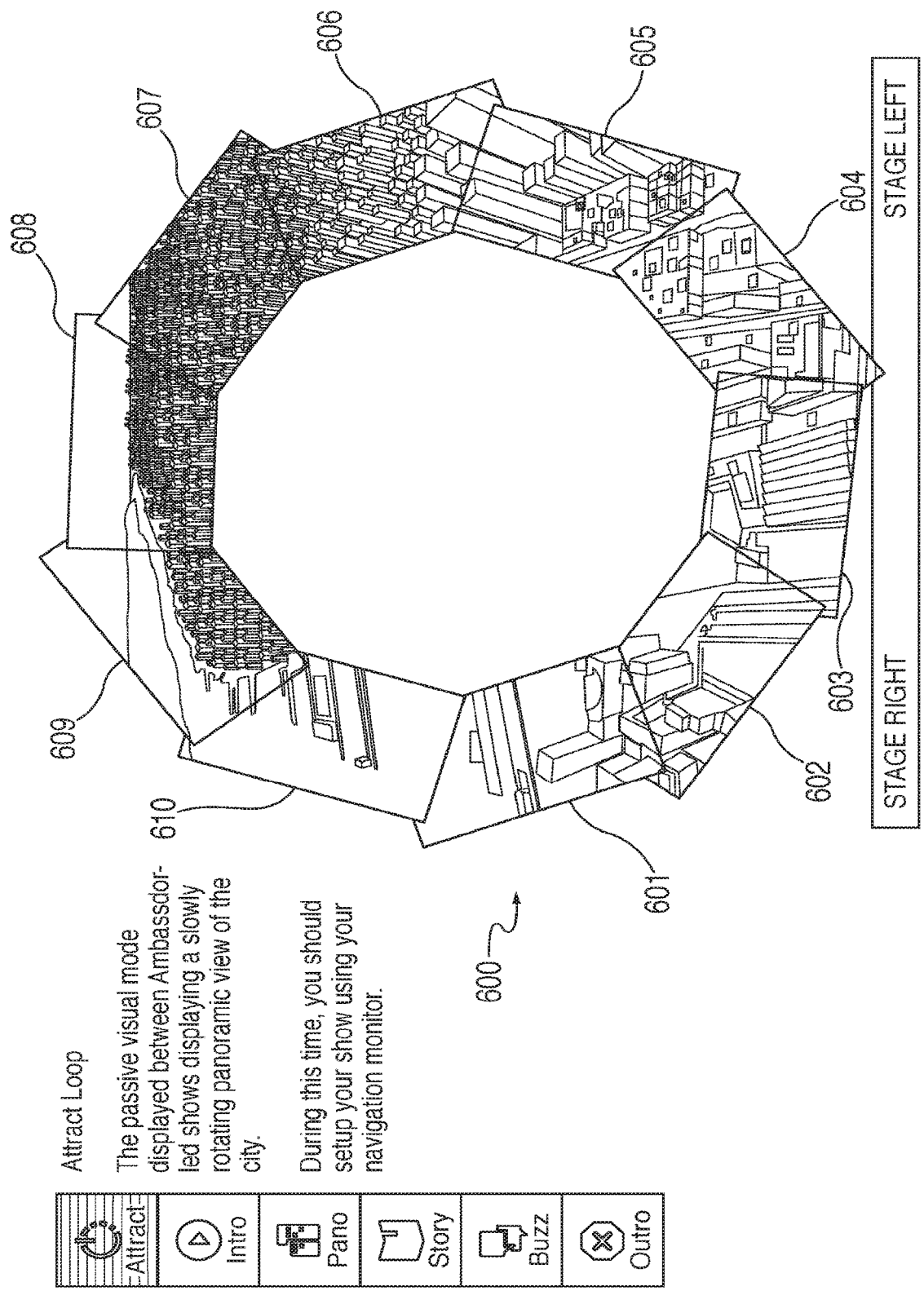
FIG. 6 is a front elevational view of the attract loop utilized in connection with the show for the attraction of FIGS. 1-5.

Reference is next made to FIG. 6, wherein a display 600 associated with the Attract Loop is shown. Display 600 includes monitors 601-610 sharing a single composite image. The Attract Loop is a passive visual mode displayed between ambassador lead shows displaying in a current preferred embodiment a slowly rotating panoramic view of New York City in connection with the thematic attraction which is based on New York. For different thematic attractions, different visual images would appear. In a preferred embodiment, the entire ring provides a single image which moves in a fashion which is easily observed. With other thematic attractions, the Attract Loop can be created to provide general background related to the theme or location of the attraction. The pictures used for the attraction mode and the full ring pictures are set so the open area in the center of the ring doesn't interfere with the ability to view the image as a single image.

Figure 7:
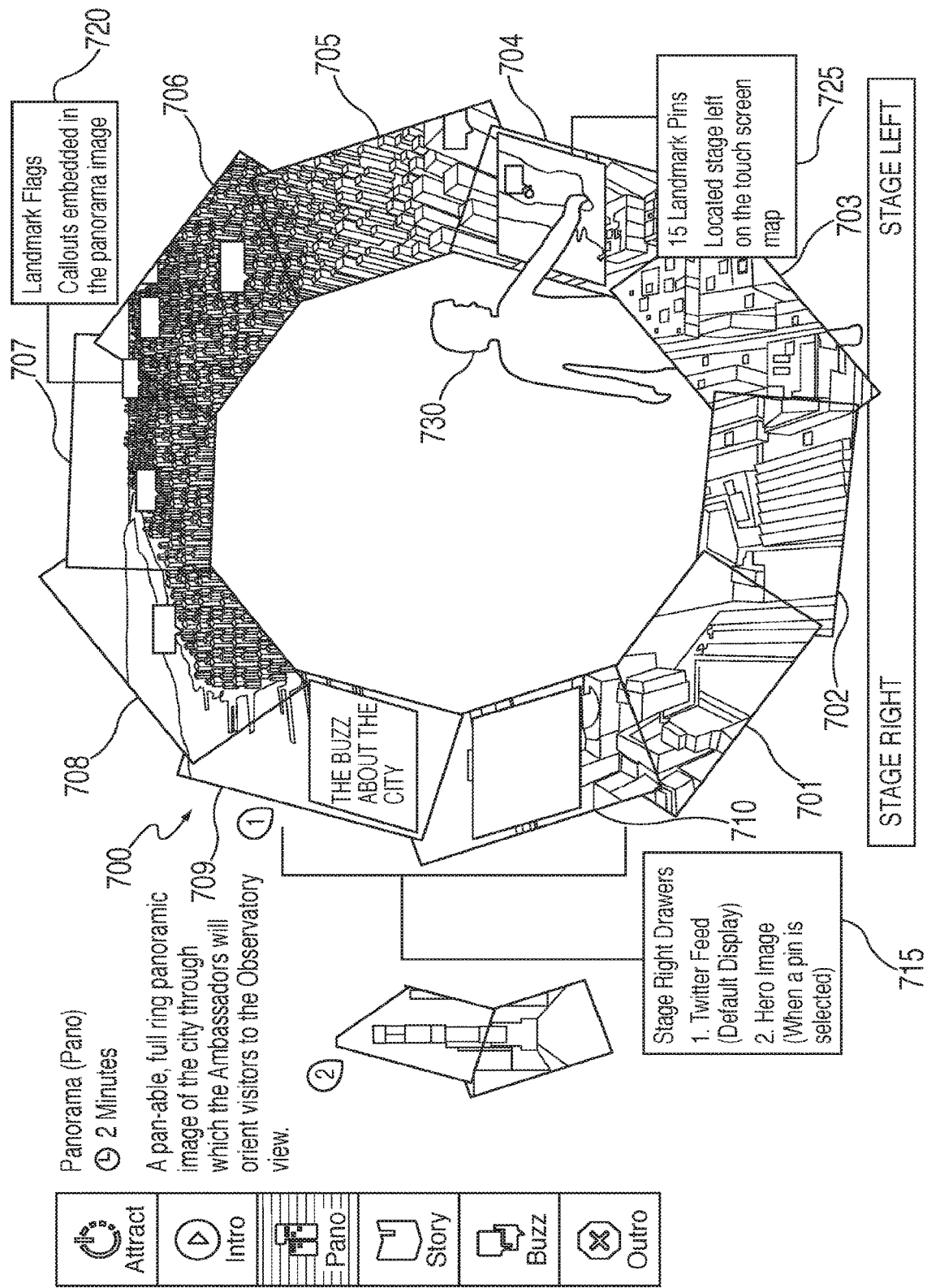
FIG. 7 is a diagrammatic and front elevational view of the display in connection with the intro mode of the attraction of FIGS. 1-6.
Figure 8:
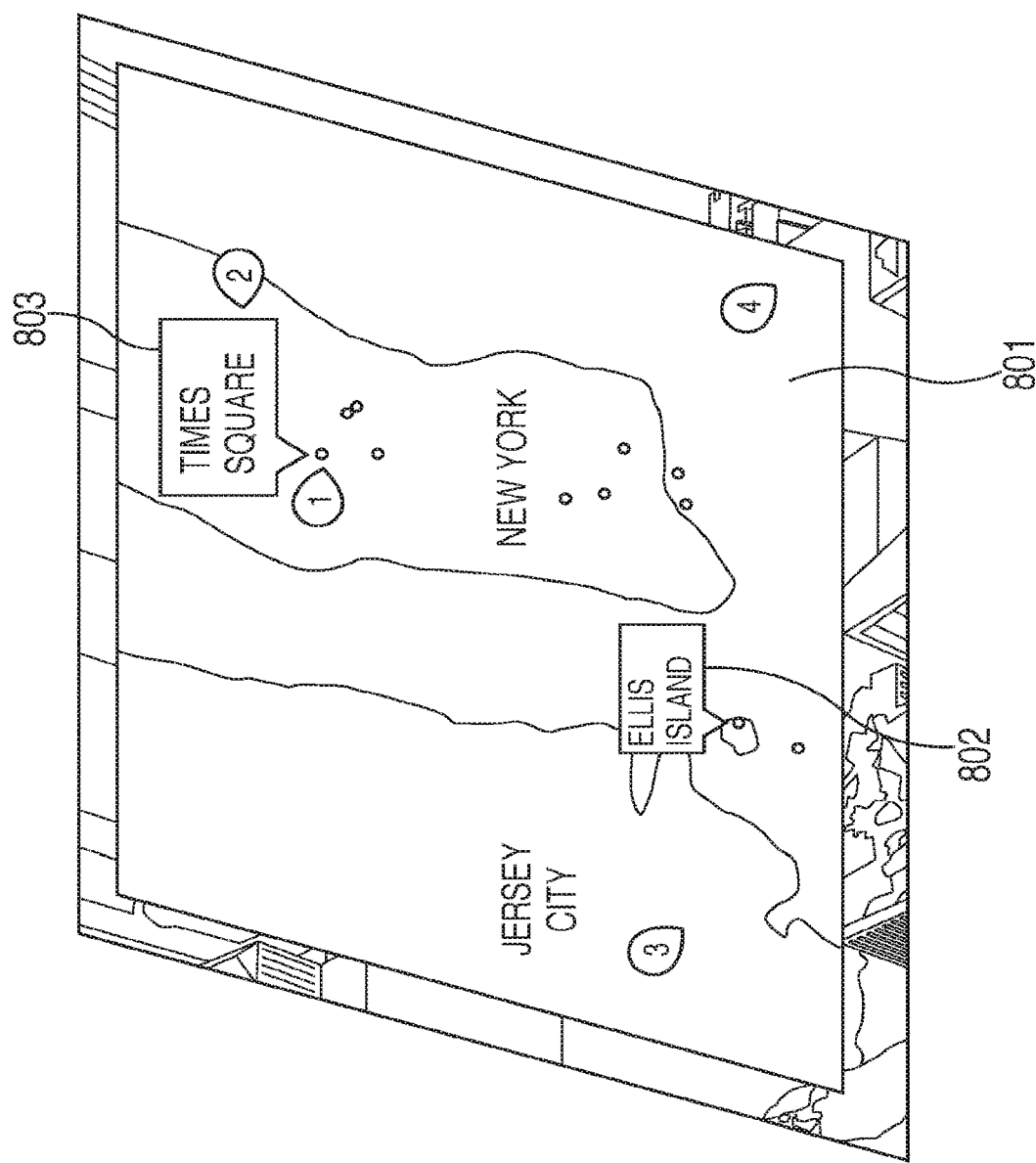
FIG. 8 is a diagrammatic view of a panoramic touch screen image in accordance with the attraction of FIGS. 1-7.

Reference is next made to FIGS. 7 and 8, which highlight the panorama mode 700 of the attraction 100. This starts with a pan-able, full ring panoramic image of the City through which the ambassador will orient visitors to the Observatory views. The ring includes displays 701-710, a twitter feed 715, landmark flags 720 and landmark pins 725. The images include a Twitter feed 715 which provides buzz about the City, which include Twitter and headline information about events and activities in the City, as well hero images of landmark pins 725, as shown in FIG. 8, when pressed by the ambassador. As shown in FIG. 8, for example, the touch screen map 801 includes a Times Square landmark pin 803, and an Ellis Island pin 802 and if the ambassador touches a pin, two contiguous displays on the left of the ring illustrate a Hero Image, which is an image focused on the landmark in question. Generally, when the ambassador presses the pin the first time, the label for that landmark is shown, tapping the label to zoom into the panorama replaces the two-element display on the left with a blown up image of the landmark zoomed in on the features and a display known as a Hero Display with the landmark in question highlighted to stand out from its surroundings. A Hero Display is a large image of the subject in question. For example, if Times Square pin 803 is pressed a large image of Times Square is displayed. The displays can be selected by audience members with the ambassador shifting between various landmark flags around the panoramic image of the City so as to orient visitors to the views from the Observatory.

Figure 9:
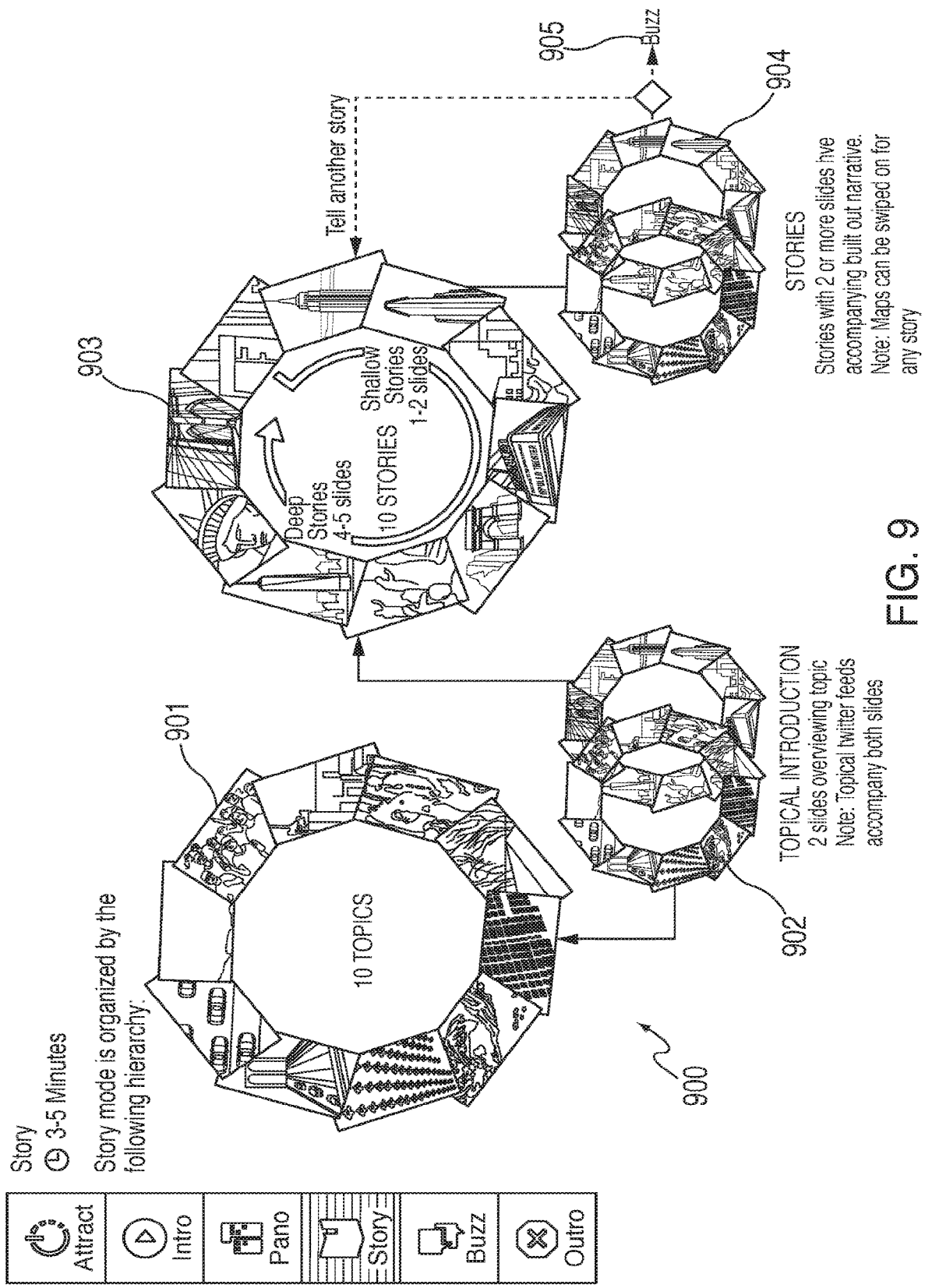
FIG. 9 is a descriptive flow chart diagram in connection with the story component of the show on the attraction of FIGS. 1-8.
Figure 10:
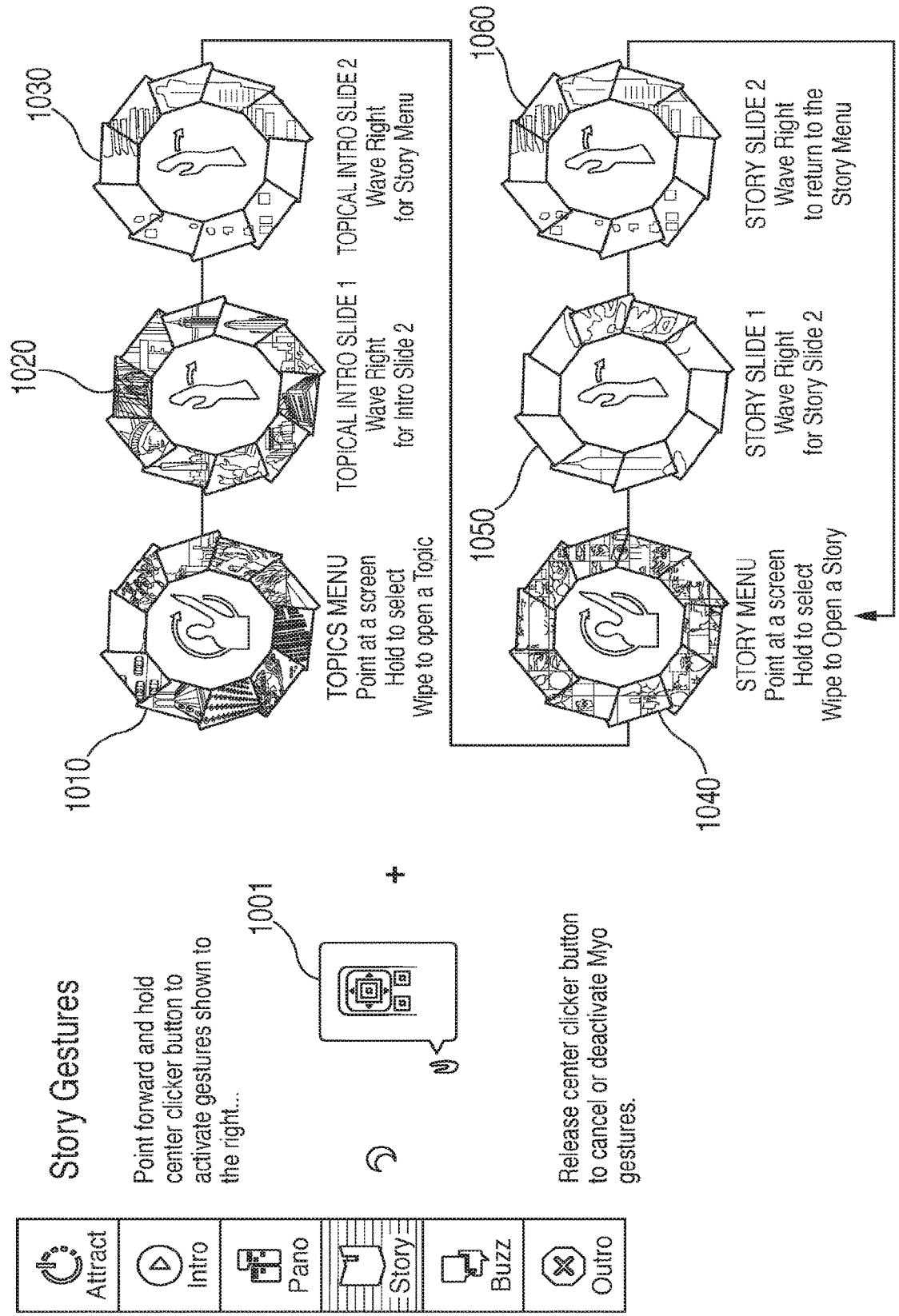
FIG. 10 is a diagrammatic view in which story gestures are utilized to advance the story in accordance with the attraction of FIGS. 1-9.
Figure 11:
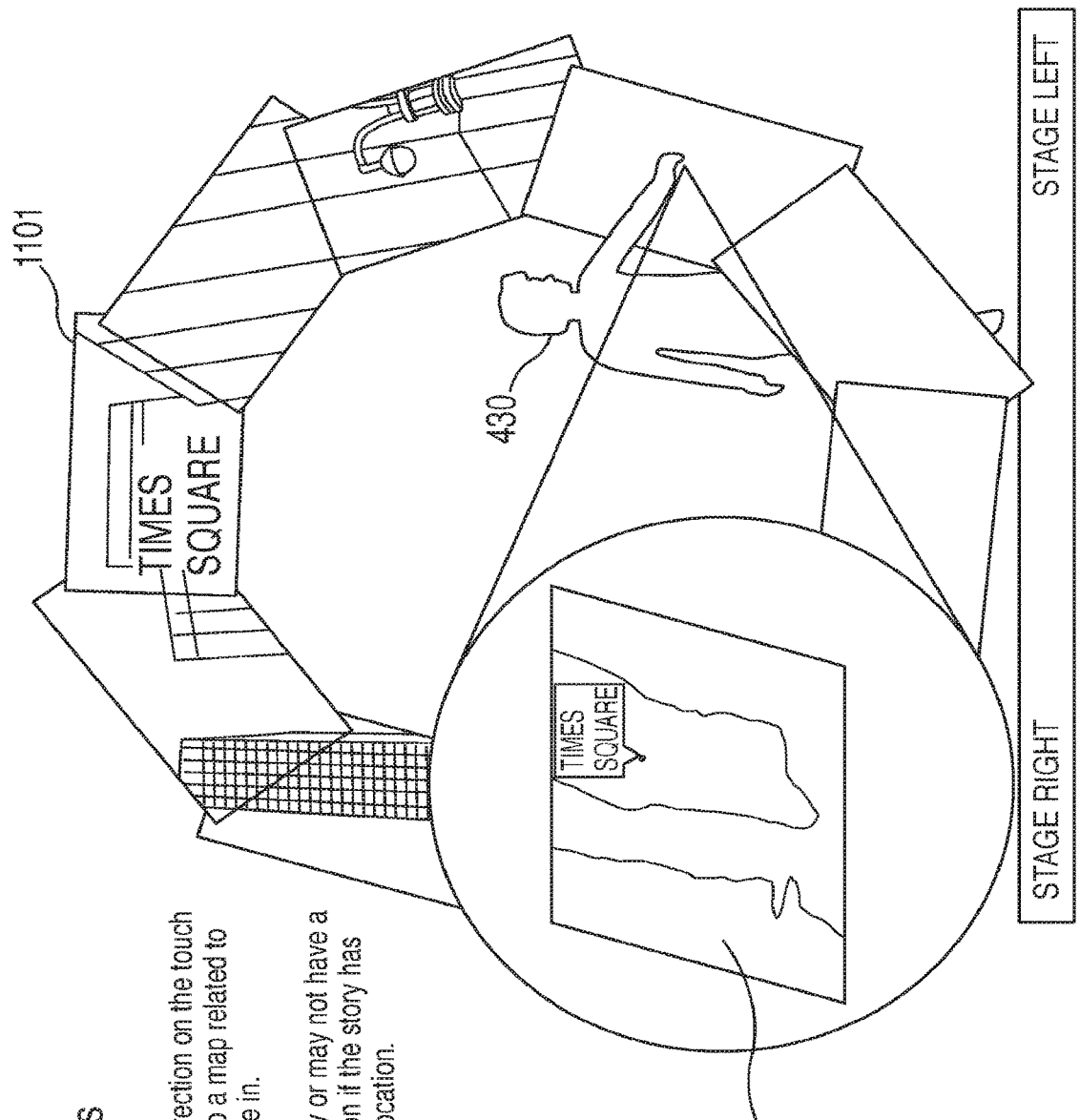
FIG. 11 is a diagrammatic view of the manner in which story maps are utilized to advance the story in accordance with the attraction of FIGS. 1-10.

After highlighting the orientation and calling up a number of landmarks to the audience, the show continues with the story component 900 of the show. As shown in FIGS. 9, 10 and 11, the story component 900 of the show starts with an initial screen 901 shown in FIG. 9, where 10 different generalized topics are shown. The topical introduction 902, if selected by the ambassador, has separate slides overviewing topics with Twitter feeds accompanying both slides. For each topic selected there are ten individualized stories 903 shown in the third section of FIG. 9. Generally, among each of the ten stories there will be a certain number of Deep Stories, which have four to five slides associated with each story and a series of Shallow Stories with only one or two slides with the story. The ambassador provides the oral components of the story which match the visual images. Generally, the images which are shown during the stories can either be full ring, partial ring, or individual display images described by the ambassador's oral narrative. The ambassador can tell additional stories for a particular topic, go back to the original ring of topics to drill down to additional stories as time and audience interest dictate. When the story period has been completed the ambassador advances the show to the Buzz phase.

As shown in FIG. 10, there is a gesture language which allows the ambassador to advance from the topic menu through the stories slotted. The gesture 1010 is used to open a Topic. The gesture 120 is used to move to intro Slide 2. Gesture 1030 is used to move to the story menu. Gesture 1040 is used to move from the Story Menu to open a Story.

Gesture 1050 is used to move to Story Slide 2. Gesture 106 is used to return to the Story Menu. When the story has a definable location, there will be a map section on the touch screen display which will include a landmark pin allowing the ambassador to tap on this and project a hero image or full ring image of the story subject, such as Times Square shown in FIG. 11. The main display 1101 is a full ring image of Times Square with a small map 1100 with a landmark pin marked Times Square. The small map 1102, which has a single display, is blown up in FIG. 11 to highlight what it shows. The ambassador 430 taps the landmark pin for Times Square on the map 1102 and the Hero Image of Times Square is shown on the screens 1101.

Figure 12:
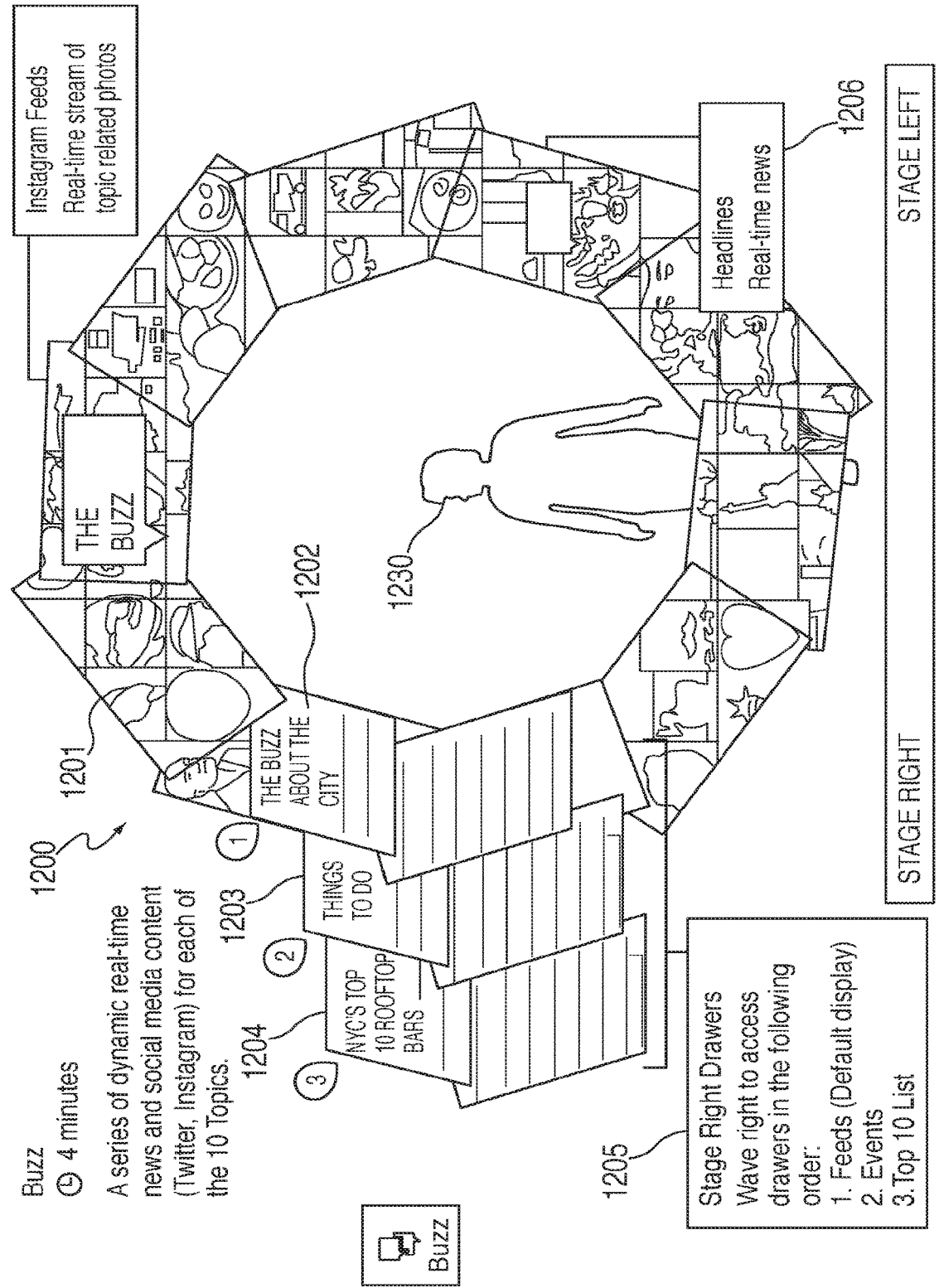
FIG. 12 is a diagrammatic view showing how a series of dynamic real-time news and social media content can be integrated into the attraction of FIGS. 1-11.

With reference to FIG. 12, the Buzz section 1200 of the show is depicted. As shown in FIG. 12, the Buzz section 1200 will include instagram and Twitter feeds 1202, 1203, 1204 which are a real-time stream of topics, related photos, headlines of real-time news and, based upon the activities of the ambassador, show on the two display panels on the left 1202, 1205, access to feeds, events related to the thematic display, in this case, New York City, and a Top 10 List. This section is active, essentially a real-time stream, although the Twitter feeds and other social medial feeds are preferably curated by an attraction team working in the background to avoid unwanted content intruding on the show.

Figure 13:
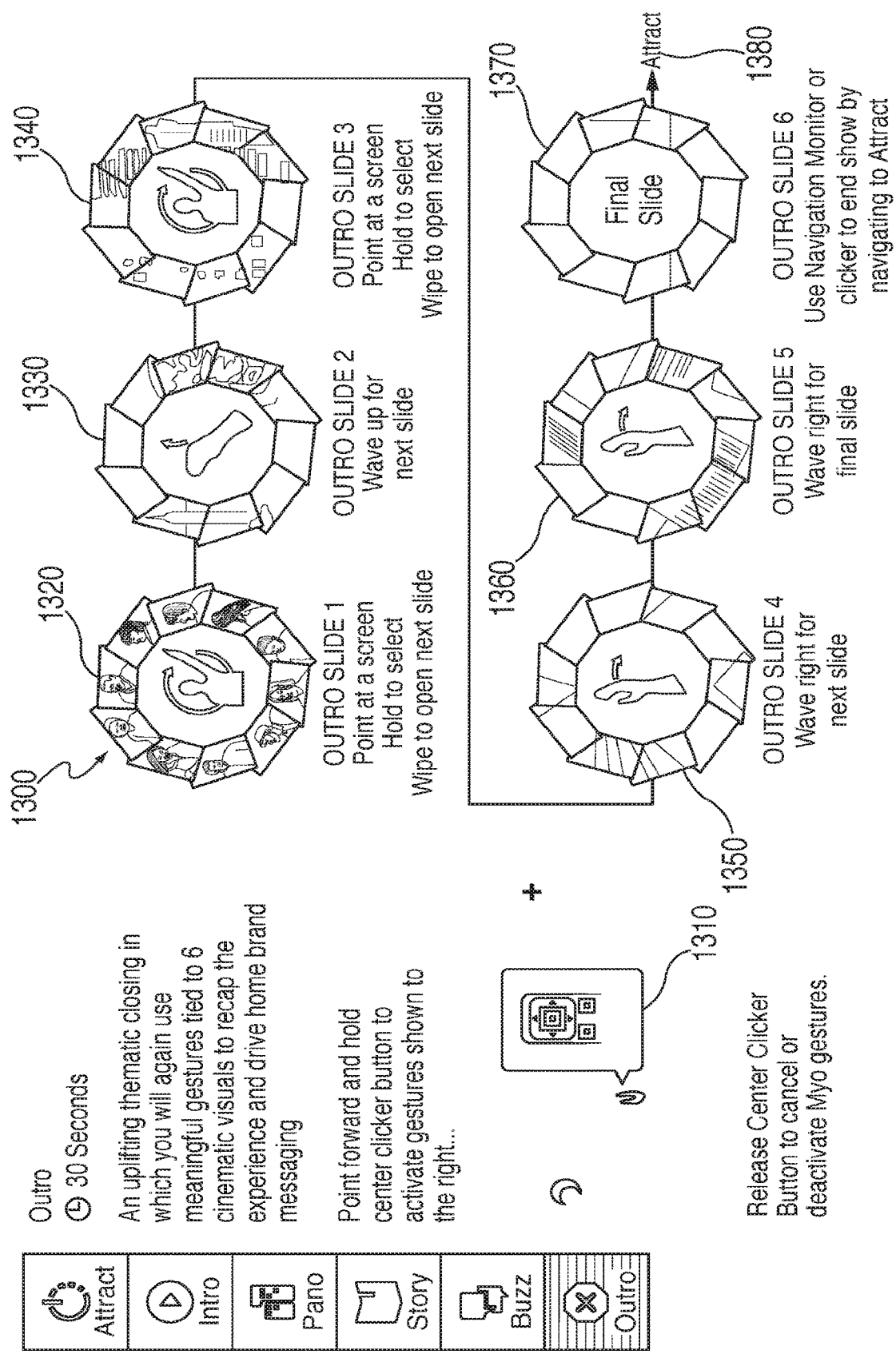
FIG. 13 is a flow chart diagram showing how the Outro closes the thematic attraction of FIGS. 1-12.

Finally, there is a short prepared Outro 1300 which is controlled, as shown in FIG. 13, to go through the final slides of the show. This is shown in slides 1320-1370 moved through by gestures. After the final slide is done, using either the navigation monitor or the clicker, the ambassador ends the show and returns the display to the Attract mode 1380 until the next show is ready to begin.

Reference is next made to FIG. 14, wherein the Bluetooth armband is shown. In the current preferred embodiment, the Bluetooth armband is a MYO armband 1410 which is worn by the ambassador 430. Sizing clips 1411 are used to configure the armband to fit a particular ambassador's arm. As with all Bluetooth devices, the armband is paired with the computer system which operates the thematic attraction before its use in a show.

The displays 110-119 for the thematic attraction 100 are controlled generally by a single or pair of computers 310 (FIG. 3) which collect the required images for display on the ring as and when appropriate. In a current preferred embodiment of the invention the ring of displays is controlled by a Mac Pro computer which provides, through USB connections, 5 video outputs, each of which provides the displays for 2 adjacent displays in the ring. The underlying text and image data is stored on a separate CMS server which, in a current preferred embodiment, is a Dell Optiplex computer. The CMS server is where changes to the text or images are stored and then uploaded to the Mac Pro driving software. In addition, a Mac Mini is used as a backup for providing the Bluetooth connection to the Bluetooth armband which is primarily driven from the same Mac Pro computer through a Bluetooth adaptor.

In a current preferred embodiment of the invention, the display is configured in a ring form with 10 similar in size elements wrapping around a ring shape. However, other geometrical structures to provide an enclosed shape or loop may be utilized, including square, rectangle, triangle, oval or any other closed shape, such that a single image can be displayed on the complete display elements. Other configurations without an open center, such as a grid of displays where the overall array forms a solid geometric shape is also suitable. For example, twelve rectangular displays in a 3.times.4 grid can be used. In addition, the number and size of each of the displays can similarly be adapted as desired to fit the characteristics of the thematic attraction. Generally, the displays should be of suitable size to allow the viewers to easily see both a unified single image on the displays and the separate series of images with a different image on each of the separate displays. The thematic attraction should be large enough to attract the attention of an appropriately significant group of viewers at a single time but not dwarf the ambassador as a controller of the show.

In accordance with a preferred embodiment of the invention, the thematic attraction is called the City Pulse and is located in the One World Observatory found at the top of One World Trade center in lower Manhattan, N.Y. In this configuration the panoramic view provided during the Panoramic stage of the show orients the viewers to the area around the World Trade Center building and the five boroughs of New York, such that the visitors can, as a component of their visit to the One World Observatory, orient themselves to the view that they will see out the windows of the Observatory. The landmark pins will be locations, buildings, and geographical landmarks surrounding the Observatory, which they may be able to see as they walk around the Observatory or the City. The topics will be ones which will be relevant to the New York metropolitan area, including sports, museums, areas of interest and the like which are central to the New York experience. Similarly, stories will provide further details related to each of the topics and each story will provide varying levels of content related to that particular story which are utilized in the story portion of the show. Finally, the Buzz will include Twitter feeds and headlines related to the One World Observatory, which will be on a relatively real-time basis subject to curation by the Observatory staff so as to exclude any improper or undesirable information which might upset the visitors.

Other uses of the thematic attraction can be utilized in connection with larger locations in different geographical areas, museums, sporting environments, resorts and other attractions where the visitors to the attraction can benefit from an orientation and more detailed stories related to the thematic attraction. As such, the topic, stories, panoramic views and landmark pins would be tailored to the specific elements of the thematic attraction and surrounding environs.

It will thus be seen that the objects set forth above, among those made apparent in the preceding description, are efficiently obtained, and, since certain changes may be made in the above construction without departing from the spirit and scope of the invention, it is intended that all matter contained in the above description or shown in the accompanying drawings shall be interpreted as illustrative, and not in a limiting sense.

It is also understood that the following s are intended to cover all of the generic and specific features of the invention herein described and all statements of the scope of the invention, which, as a matter of language, might be said to fall therebetween.

The invention claimed is:

1. An improved thematic attraction comprising:
a vertically oriented ring shaped support;
a geometrically arranged plurality of displays mounted to the support and positioned to form a vertically oriented closed loop of displays with an open center, the closed loop of displays having a front side wherein images shown on each of the plurality of displays would be visible to an audience facing the front side and a rear side where a human concierge can be positioned and would be visible by the audience through the open center.

2. The improved thematic attraction of claim 1, further comprising a control system for providing images to be shown on the displays and an interactive control coupled to the control system for selecting the images to be displayed, wherein the human concierge using the interactive control and positioned by the rear side would be visible by the audience through the open center.

3. The improved thematic attraction of claim 1, wherein each display is mounted to the support with a respective mounting apparatus.

4. The improved thematic attraction of claim 3, wherein the support comprises an inner structural element and an outer shell, the mounting apparatus for each respective display attached to the inner structural element.

5. The improved thematic attraction of claim 4, wherein the mounting apparatus for each respective display comprises a mounting plate connected to the respective display and a standoff connected between the mounting plate and the inner structural element.

6. The improved thematic attraction of claim 4, further comprising conductors to connect the plurality of displays to a computer, the conductors routed circumferentially around the support inside the outer shell.

7. The improved thematic attraction of claim 1, wherein the plurality of displays are in separate respective housings and adjacent displays of the geometrically arranged plurality of displays at least partially overlap each other.

8. The improved thematic attraction of claim 1, wherein each display has a horizontal axis, the horizontal axes of adjacent displays of the geometrically arranged plurality being angled with respect to each other.

9. The improved thematic attraction of claim 1, wherein the closed loop is generally circular.

10. A improved thematic attraction comprising:
a vertically oriented circular support;
a geometrically arranged plurality of displays mounted to the support and positioned to form a vertically oriented circular loop of displays with an open center, the loop of displays having a front side wherein images shown on each of the plurality of displays would be visible to an audience facing the front side and a rear side where a human concierge can be positioned and would be visible by the audience through the open center.

11. The improved thematic attraction of claim 10, the support comprising an inner structural ring and an outer shell surrounding the structural ring, each display mounted to the support by a mounting apparatus attached to the structural ring.

12. The improved thematic attraction of claim 11, further comprising supports positioned between the structural ring and the outer shell.

13. The improved thematic attraction of claim 11, further comprising conductors to connect the plurality of displays to a computer, the conductors routed circumferentially around the support inside the outer shell.

14. The improved thematic attraction of claim 11, wherein the plurality of displays are in separate respective housings, each display having a horizontal axis, the plurality of displays mounted to the support so that adjacent displays at least partially overlap each other and so that the horizontal axes of adjacent displays are angled with respect to each other.

15. The improved thematic attraction of claim 10, further comprising a control system for providing images to be shown on the displays and an interactive control coupled to the control system for selecting the images to be displayed, wherein the human concierge using the interactive control and positioned behind the rear side would be visible by the audience through the open center.

16. A improved thematic attraction comprising:
 a vertically oriented circular support having an inner structural ring and an outer shell surrounding the structural ring;
 a geometrically arranged plurality of displays mounted on respective mounting apparatus connected to the structural ring;
 the plurality of displays positioned symmetrically around the support to form a vertically oriented circular loop of displays with an open center, each display being in a respective housing and having a horizontal axis, the plurality of displays mounted so that adjacent displays partially overlap each other and so that the horizontal axes of adjacent displays are angled with respect to each other;
 the loop of displays having a front side wherein images shown on each of the plurality of displays would be visible to an audience facing the front side and a rear side where a human concierge can be positioned and would be visible by the audience through the open center.

17. The improved thematic attraction of claim 16, further comprising conductors to connect the plurality of displays to a computer, the conductors routed circumferentially around the support inside the outer shell.

18. The improved thematic attraction of claim 16, further comprising supports positioned between the structural ring and the outer shell.

19. The improved thematic attraction of claim 16, wherein the mounting apparatus for each respective display comprises a mounting plate connected to the respective display and a standoff connected between the mounting plate and the structural ring.

20. The improved thematic attraction of claim 16, further comprising a control system for providing images to be shown on the displays and an interactive control coupled to the control system for selecting the images to be displayed, wherein the human concierge using the interactive control and positioned by the rear side would be visible by the audience through the open center.

\* \* \* \* \*